United States Patent
Kaneda et al.

(10) Patent No.: US 9,768,883 B2
(45) Date of Patent: Sep. 19, 2017

(54) LOW POWER EQUALIZER FOR AN OPTICAL RECEIVER

(71) Applicant: Alcatel-Lucent USA Inc., Murray Hill, NJ (US)

(72) Inventors: Noriaki Kaneda, Westfield, NJ (US); Timo Pfau, Westfield, NJ (US); Jeffrey Lee, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 293 days.

(21) Appl. No.: 14/460,593

(22) Filed: Aug. 15, 2014

(65) Prior Publication Data
US 2016/0050023 A1 Feb. 18, 2016

(51) Int. Cl.
*H04B 10/06* (2006.01)
*H04B 10/61* (2013.01)

(52) U.S. Cl.
CPC ....... *H04B 10/616* (2013.01); *H04B 10/6161* (2013.01)

(58) Field of Classification Search
CPC ...... H04B 10/6161; H04B 10/06; H04J 14/06
USPC ........................................ 398/202, 206, 208
See application file for complete search history.

(56) References Cited

U.S. PATENT DOCUMENTS

| 8,953,951 | B1 * | 2/2015 | Thomas | H04B 10/25133 |
| | | | | 398/202 |
| 9,025,651 | B1 * | 5/2015 | Dave | H04B 10/2569 |
| | | | | 375/229 |
| 2006/0013590 | A1 * | 1/2006 | Hueda | H04B 10/60 |
| | | | | 398/149 |
| 2010/0119241 | A1 * | 5/2010 | Yang | H04B 10/60 |
| | | | | 398/208 |
| 2010/0329683 | A1 * | 12/2010 | Liu | H04B 10/2513 |
| | | | | 398/81 |
| 2011/0064421 | A1 * | 3/2011 | Zhang | H04B 10/6161 |
| | | | | 398/208 |
| 2012/0002979 | A1 * | 1/2012 | Xie | H04B 10/611 |
| | | | | 398/208 |

(Continued)

OTHER PUBLICATIONS

U.S. Appl. No. 14/460,586, filed Aug. 15, 2014, entitled "Chromatic Dispersion Compensator With Integrated Anti-Aliasing Filter and Resampler".

(Continued)

*Primary Examiner* — David Payne
*Assistant Examiner* — Pranesh Barua
(74) *Attorney, Agent, or Firm* — Davidson Sheehan LLP (57) ABSTRACT

An optical receiver includes an equalizer to generate a plurality of equalization coefficients corresponding to a plurality of frequencies of an optical signal received by the optical receiver. The equalizer zeroes out a first subset of the equalization coefficients corresponding to a first subset of the plurality of frequency components and applies a second subset of non-zero equalization coefficients to the first signal. The optical receiver may also include a chromatic dispersion compensator to generate inverse chromatic dispersion coefficients corresponding to the plurality of frequency components, and to zero out a first subset of the inverse chromatic dispersion coefficients corresponding to the first subset of the plurality of frequency components and further to apply a second subset of non-zero inverse chromatic dispersion coefficients to a second optical signal.

19 Claims, 7 Drawing Sheets

(56) References Cited

U.S. PATENT DOCUMENTS

| | | | | |
|---|---|---|---|---|
| 2012/0039607 A1* | 2/2012 | Ogasahara | ......... | H04B 10/6971 |
| | | | | 398/65 |
| 2012/0087679 A1* | 4/2012 | Goldfarb | ............ | H04B 10/6165 |
| | | | | 398/208 |
| 2012/0274364 A1* | 11/2012 | Chen | ................... | H03M 1/0836 |
| | | | | 327/101 |
| 2013/0302041 A1* | 11/2013 | Matsui | ............... | H04B 10/6161 |
| | | | | 398/208 |
| 2014/0363173 A1* | 12/2014 | Dave | ............... | H04B 10/25137 |
| | | | | 398/149 |

OTHER PUBLICATIONS

U.S. Appl. No. 14/308,756, filed Jun. 19, 2014, entitled "Optical Receiver Having an Equalization Filter With an Integrated Signal Re-sampler".

* cited by examiner

LOW POWER EQUALIZER FOR AN OPTICAL RECEIVER

This application is related to Ser. No. 14/460,586, filed on Aug. 15, 2014. This application is also related to Ser. No. 14/308,756, filed on Jun. 19, 2014.

BACKGROUND

Field of the Disclosure

The present disclosure relates generally to detection of optical signals and, more particularly, to equalization of optical signals.

Description of the Related Art

Digital signal processing (DSP) is used for coherent (intradyne or homodyne) detection of optical communication signals in optical transport systems. For example, DSP-based detection of coherent wavelength division multiplexed (WDM) optical signals is used for long-haul and metro WDM optical transport networks. The application-specific integrated circuits (ASICs) that have been developed to perform DSP detection of optical signals often require relatively high power consumption, which impedes the development of commercially viable optical transceivers suitable for data rates higher than about 100 gigabits per second (Gbps). Power consumption can be reduced by reducing the sampling rate of the analog-to-digital converters (ADCs) that sample input symbols to produce digital signals that can be processed to recover the information carried by the symbols. For example, reducing the sampling rate of the ADC from two samples per symbol (SPS) to 1.P SPS (where ".P" is a decimal fractional value smaller than one) can reduce the power consumption by a factor of approximately (2-1.P)/2. However, reducing the sampling rate to a value less than 2 SPS introduces aliasing noise into the digital signals because the signal bandwidth can exceed the Nyquist limit. The aliasing noise can be filtered using an analog filter but anti-aliasing filters with analog components can be difficult or costly to manufacture, particularly if the manufacturing specifications for the anti-aliasing filter are stringent.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an optical receiver is provided that includes an equalizer. Some embodiments of the equalizer generate a plurality of equalization coefficients corresponding to a plurality of frequency components of a first optical signal received by the optical receiver. Some embodiments of the equalizer set to zero a first subset of the equalization coefficients corresponding to a first subset of the plurality of frequency components and apply a second subset of non-zero equalization coefficients to the first signal.

In some embodiments, a method is provided for performing equalization in an optical receiver. Some embodiments of the method include generating, at an equalizer, a plurality of equalization coefficients corresponding to a plurality of frequency components of a first optical signal received by an optical receiver. Some embodiments of the method also include zeroing out a first subset of the equalization coefficients corresponding to a first subset of the plurality of frequency components and applying a second subset of non-zero equalization coefficients to the first signal.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The power consumed by an optical receiver implemented on an application-specific integrated circuit (ASIC) during DSP-based detection of coherent optical signals can be significantly reduced without introducing aliasing noise by zeroing a subset of equalization coefficients applied to a signal in an equalizer, wherein the subset of equalization coefficients corresponds to a subset frequency components of the signal. The non-zero equalization coefficients and the corresponding portions of the signal may then be multiplied to equalize the signal, thereby reducing the number of complex multiplications performed in the equalizer. In some embodiments, a chromatic dispersion compensator (CDC) and adaptive channel equalizers—such as constant modulus algorithm (CMA) or least mean square (LMS)—in the optical receiver may include a low pass filter that zeros out a subset of equalizer filter coefficients that correspond to the subset of frequency components of the signal, thereby reducing the number of complex multiplications performed by the CDC and the adaptive channel equalizers (e.g., CMA, LMS). The multipliers implemented in the equalizer and the CDC consume most of the power used by the equalizer or the CDC. Consequently, reducing the number of complex multiplications performed in the equalizer or the CDC significantly reduces their power consumption. For example, power consumption may be reduced by 40% by zeroing out equalizer coefficients or inverse chromatic dispersion coefficients corresponding to a range of frequencies above half the baud rate for a 2 SPS optical receiver with a 1.2 SPS loaded spectrum. The performance of the 2 SPS optical receiver is minimally affected because of redundancy in spectrum usage.

Figure 1:
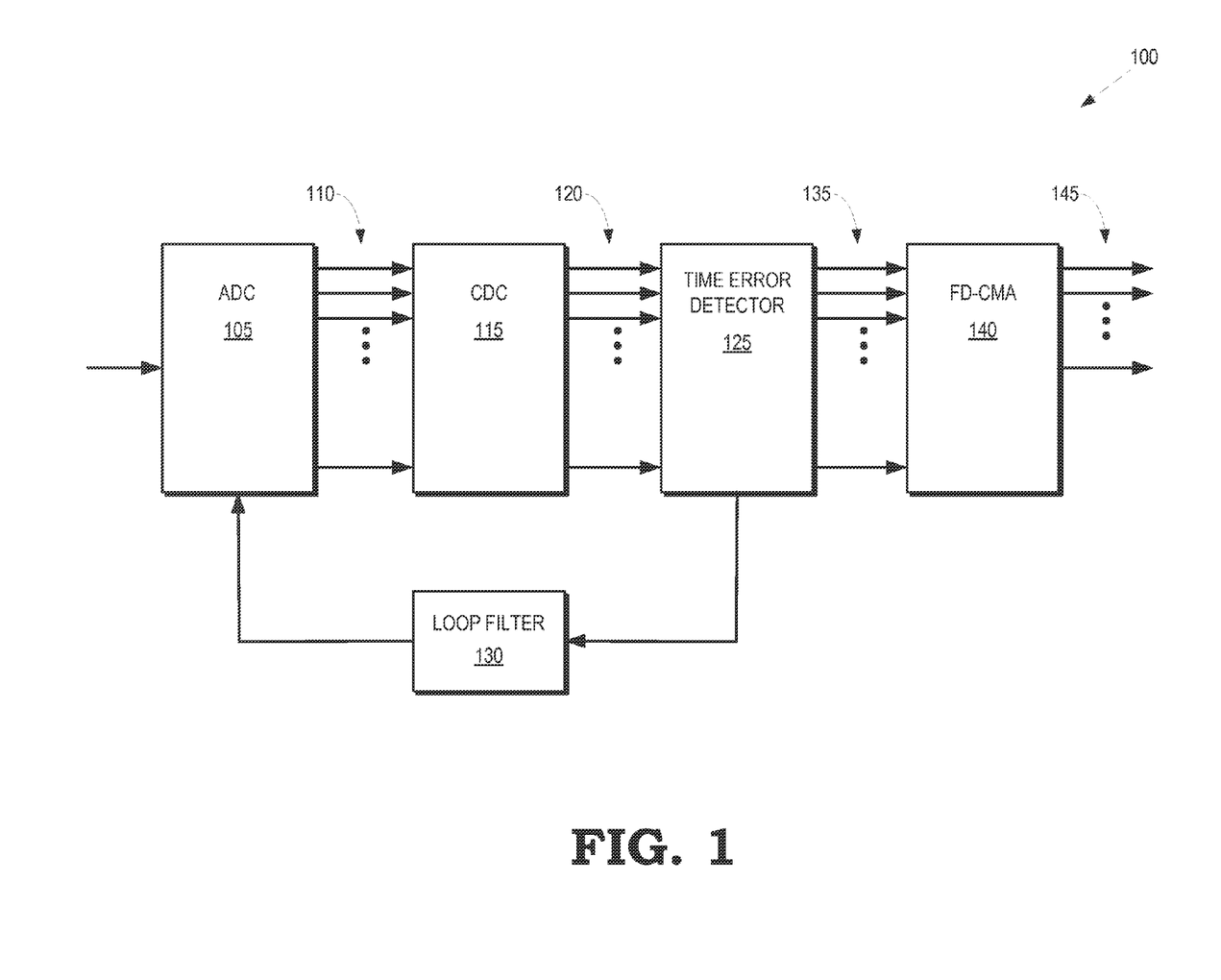
FIG. 1 is a block diagram of a portion of an optical receiver for digital signal processing (DSP) of coherent optical transmission signals according to some embodiments.

FIG. 1 is a block diagram of a portion 100 of an optical receiver for digital signal processing (DSP) of coherent optical transmission signals according to some embodiments. The optical receiver may be implemented as an ASIC. The portion 100 includes an analog-to-digital converter (ADC) 105 that converts a continuous electrical signal (such as a voltage) representative of symbols conveyed in the coherent optical transmission signals into a set of digital samples each having a value of an optical signal. Each such digital sample is thus referred to a "digital signal value." Hereinafter, the terms "a sample" (used as a noun), "digital sample", "sampled signal" and "digital signal value" are used interchangeably. Some embodiments of the ADC 105 sample the continuous electrical signal at a predetermined sampling rate. For example, the ADC 105 may sample the continuous electrical signal at a sampling rate of two symbols per second (2 SPS). The ADC 105 generates a set of QN complex digital signal values to represent each symbol conveyed in the coherent optical transmission signals. In some embodiments, Q and N are positive integers. The QN complex digital signal values for each symbol are concurrently asserted in parallel on QN lines 110.

Chromatic dispersion may cause the optical signals representative of the symbols to spread (or disperse) as they propagate through optical fibers prior to arriving at the portion 100 of the ASIC, which may degrade the optical signals. The portion 100 therefore includes a chromatic dispersion compensator (CDC) 115 to compensate for the effects of chromatic dispersion. Some embodiments of the CDC 115 may perform frequency domain equalization by applying a frequency dependent transfer function to different frequency components of the sampled signals generated by the ADC 105, as discussed herein. Frequency dependent transfer functions for performing frequency domain equalization for chromatic dispersion compensation are known in the art. Power consumption may be reduced in some embodiments of the CDC 115 by zeroing out a subset of the inverse chromatic dispersion coefficients and applying the non-zero inverse chromatic dispersion coefficients to the frequency components of the sampled signals, as discussed herein.

In the illustrated embodiment, the CDC 115 does not resample the sampled signals and so the CDC 115 asserts QN samples concurrently in parallel on QN lines 120. However, in some embodiments discussed herein, the CDC 115 incorporates resampling logic to sample the digital signal values received from the ADC 105 at a second sampling rate, which is different than the first sampling rate used by the ADC 105. For example, the CDC 115 may sample the digital signal values at a lower sampling rate than the sampling rate used by the ADC 105 to reduce the QN received samples to QM samples, where M<N. The QM samples may then be concurrently asserted in parallel on QM lines 120. Some embodiments of the CDC 115 may therefore also incorporate an anti-aliasing filter to filter a subset of the frequency components of the sampled signals by applying a transfer function that combines two frequency dependent transfer functions: (1) the frequency dependent transfer function used for chromatic dispersion compensation and (2) a frequency dependent transfer function that filters the subset of the frequency components that may include alias signals, as discussed herein. Thus, both chromatic dispersion compensation and anti-aliasing filtering may be performed in a single integrated operation in the CDC 115, as discussed herein. Resampling the signal using the CDC 115 can significantly reduce power consumption in components of the portion 100 of the ASIC that are downstream from the CDC 115.

A portion 100 of the optical receiver includes a timing error detector 125 for detecting timing errors in the signals asserted on the lines 120. The timing error detector 125 may provide feedback information representative of the timing errors to the ADC 105 so that the ADC 105 can correct for the timing errors. The feedback may be provided via a loop filter 130. The timing error detector 125 may also pass through the QN samples and assert them concurrently in parallel on QN lines 135.

Another portion 100 of the optical receiver includes an equalizer such as a frequency domain constant modulus algorithm (FD-CMA) filter 140. However, in some embodiments the equalizer may implement other algorithms such as a least mean square (LMS) algorithm implemented in the frequency domain. The FD-CMA 140 may be used to calculate coefficients for a finite impulse response (FIR) filter. Some embodiments of the FD-CMA 140 can generate equalization coefficients corresponding to frequency components of the digital signal values generated by the CDC 115 and provided to the FD-CMA 140 via the time error detector 125. The FD-CMA 140 may then modify the equalization coefficients so that a subset of the frequency domain equalization coefficients corresponding to a subset of the frequency components of the digital signal values are set equal to zero. Modification of the equalization coefficients in this manner may be referred to as "zeroing out" the equalization coefficients. If the CDC 115 also zeros out inverse chromatic dispersion coefficients for a subset of the frequency components, as discussed herein, the subset zeroed out by the FD-CMA 140 may correspond to the frequency components zeroed out by the CDC 115. The FD-CMA 140 may then apply the non-zero equalization coefficients to the frequency components.

In some embodiments, the FD-CMA 140 samples the digital signal values (resulting from the sampling of an incoming analog signal performed by ADC 105) at a lower sampling rate. For example, if the CDC 115 does not sample the resulting digital signal values (from ADC 105 sampling the incoming analog signal at a rate of 2 SPS) at a lower sampling rate such as 1.2 SPS, the FD-CMA 140 may sample the digital signal values received from the CDC 115 (passed on from ADC 105) at 1.0 SPS instead of the sampling rate of 2 SPS used by the ADC 105 to sample the incoming analog signal. For another example, if the CDC 115 samples the digital signal values (resulting from the sampling of the incoming analog signal) at 1.P SPS instead of 2 SPS, the FD-CMA 140 may sample the digital signal values received from the CDC 115 at 1.0 SPS instead of the sampling rate of 1.P SPS used by the CDC 115 to sample the digital signal values received from the ADC 105. The resulting digital signal values from the sampling performed by CDC 115 may then be concurrently asserted in parallel on lines 145.

Figure 2:
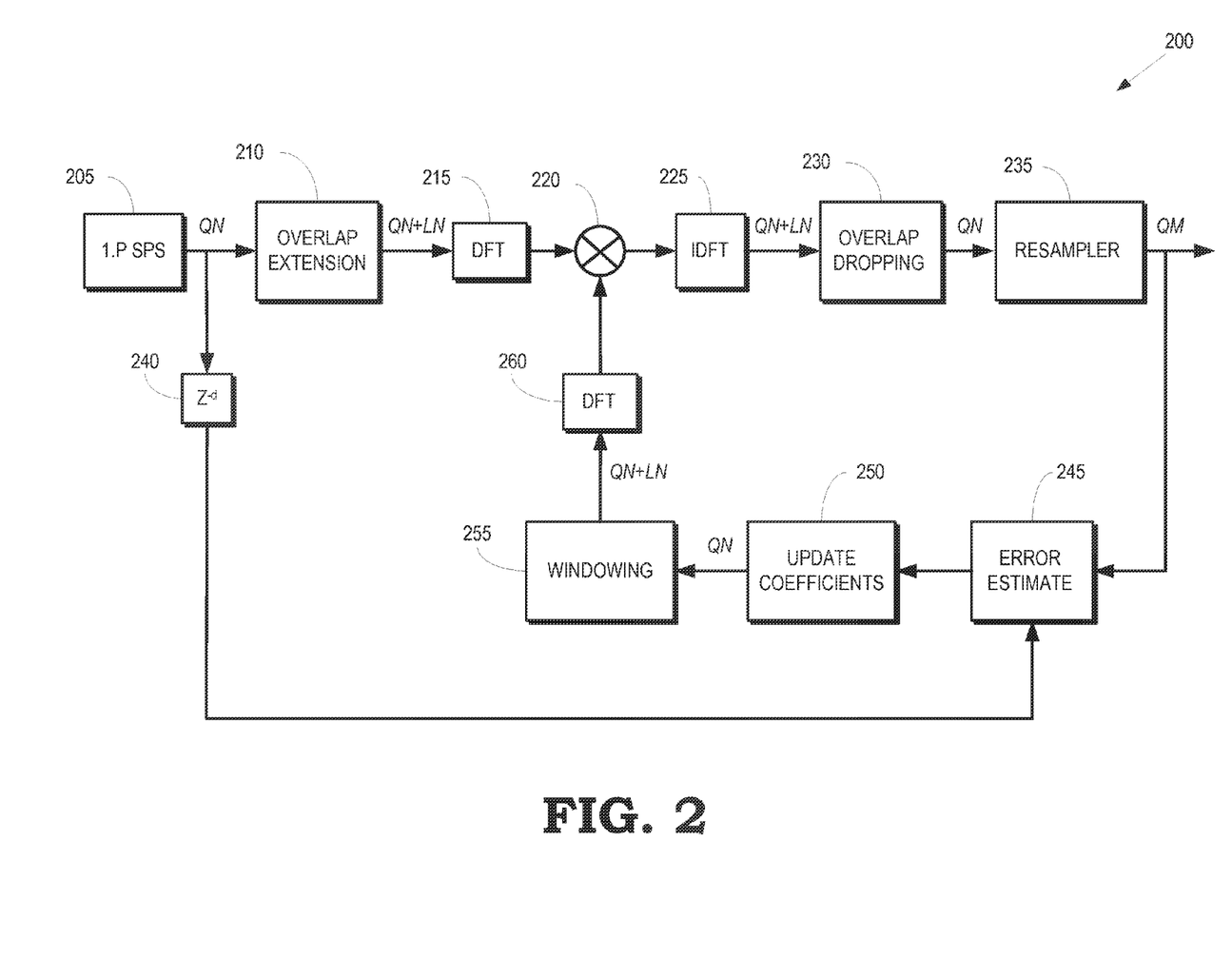
FIG. 2 is a block diagram of a frequency domain constant modulus algorithm (FD-CMA) for equalizing a received signal according to some embodiments.

FIG. 2 is a block diagram of an FD-CMA 200 for equalizing a received signal according to some embodiments. The FD-CMA 200 may be used to implement some embodiments of the FD-CMA 140 in FIG. 1. The FD-CMA 200 receives signals sampled at a first sampling rate such as 2-SPS or 1.P-SPS signals, where 1.P=M/N and M and N are integers, which may correspond to the concurrent parallel signals received over the lines 135 from the time error detector 125 shown in FIG. 1. For example, the FD-CMA 200 may receive 2 SPS signals if the CDC 115 does not implement a resampler and the ADC 105 provides digital signal values generated by sampling an analog signal at 2 SPS. For another example, the FD-CMA 200 may receive 1.2 SPS signals if the CDC 150 implements a resampler and samples the digital signal values provided by the ADC 105 at a sampling rate of 1.2 SPS instead of the 2 SPS sampling rate used by the ADC 105.

An overlap extension block 210 may be used to extend the sampled signals by adding previous signals that were sampled at the first sampling rate during an earlier time interval. For example, the QN sampled signals may be extended by LN samples to create an extended set of QN+LN sampled signals. Extending the set of signals may improve the representation of the signals in the frequency domain. A discrete Fourier transform (DFT) block 215 is used to transform the extended set of QN+LN sampled signals into a corresponding set of frequency components that represents the sampled signals. The set of frequency components may then be provided to a multiplier 220, which may be used to multiply the set of frequency components by corresponding equalization coefficients, as discussed herein.

The multiplier 220 may provide the corrected and filtered frequency components to an inverse DFT (IDFT) 225 to transform the frequency components back into a set of time domain sample signals. For example, the IDFT 225 may generate an extended set of QN+LN sampled signals. An overlap dropping block 230 may be used to remove the sampled signals corresponding to the LN samples that were added by the overlap extension block 210 to create the extended set of QN+LN sampled signals. Some embodiments of the FD-CMA 200 include a resampler 235 to sample the received digital signal values at a different sampling rate, which may be larger or smaller than the sampling rate used to generate the digital signal values provided to the FD-CMA 200. For example, the resampler 235 may be a 2:1 downsampler that samples the digital signal values at 1.0 SPS instead of the sampling rate of 2 SPS that was used to generate the received digital signal values. For another example, the resampler 235 may be a 1.2:1 downsampler that samples the digital signal values at 1.0 SPS instead of the sampling rate of 1.2 SPS that was used to generate the received digital signal values. The FD-CMA 200 may then provide the QM sampled signals to downstream components of an optical receiver such as the optical receiver 100 shown in FIG. 1.

The equalization coefficients that are applied to the signal by the multiplier 220 may be generated using feedback from the output of the FD-CMA 200 and delayed input signals. For example, the FD-CMA 200 may include a delay element 240 to delay a portion of the input signals that are used to estimate errors in the output signal. The duration of the delay imposed by the delay elements 240 may be chosen to account for latency in the FD-CMA 200 so that the input symbols are aligned with the feedback symbols. Some embodiments of the FD-CMA 200 include an error estimator 245 that can estimate errors in the output signal. For example, for a polarization division multiplexed, quadrature phase shift key (PDM-QPSK) constellation, the error estimator 245 can generate a set of error estimates, $e_{ml}$:

$$e_{ml}(k) = (1 - |b_m'(k)|^2) b_m'(k) g_l^*(k)$$

where k is a counter of clock periods, $b_m'(k)$ is a value of a delayed signal in the k-th clock period such as the signal provided by the delay elements 240, $g_l^*(k)$ is the value of the feedback signal, and the superscript "*" indicates a complex conjugate.

The equalization coefficients may be generated or updated at block 250 using the error estimates. Techniques for generating equalization coefficients based on error estimates, such as CMA or LMS techniques, are known in the art and in the interest of clarity are not discussed in detail herein. The block 250 may also modify the equalization coefficients to zero out a subset of the equalization coefficients. For example, the block 250 may modify the equalization coefficients to zero out a subset of the equalization coefficients corresponding to high frequency components of a 2 SPS oversampled signal so that the remaining non-zero equalization coefficients correspond to frequency components of a 1.2 SPS oversampled signal. In some embodiments, the equalization coefficients that are zeroed out in the block 250 may correspond to the inverse chromatic dispersion coefficients that are zeroed out in an upstream CDC, as discussed herein. For example, the frequency range of the zeroed out equalization coefficients may correspond to the frequency range of the zeroed out inverse chromatic dispersion coefficients. A windowing function 255 may be used to provide a window function to the equalization coefficients, which may then be converted from the time domain to the frequency domain by the DFT 260.

The multiplier 220 multiplies the non-zero equalization coefficients and the corresponding frequency components of the frequency domain signal provided by the DFT 215. The multiplier 220 may also bypass multiplying the zeroed out equalization coefficients by their corresponding frequency components, which may reduce the number of multiplications performed by the multiplier 220 per processing block of QN+LN. For example, if the zeroed out subset of the equalization coefficients corresponds to high frequency components of a 2 SPS oversampled signal so that the remaining non-zero equalization coefficients correspond to frequency components of a 1.2 SPS oversampled signal, the number of multiplications may be reduced by 40%. The multiplier 220 may be a primary power consumer in the FD-CMA 200 and consequently reducing the number of multiplications may lead to a corresponding reduction in power consumption.

Figure 3:
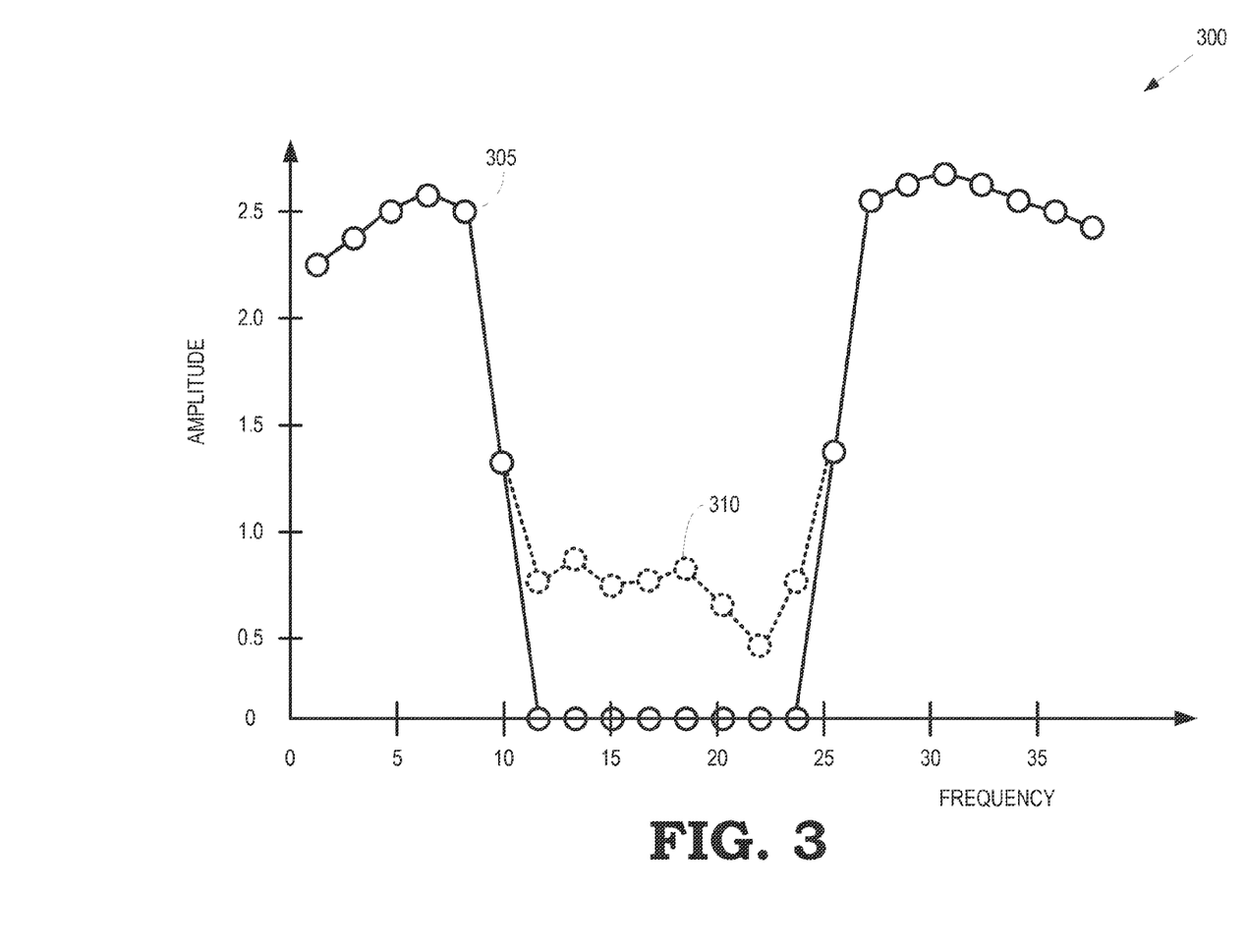
FIG. 3 is a plot of equalization coefficients in the frequency domain according to some embodiments.

FIG. 3 is a plot 300 of equalization coefficients 305 in the frequency domain according to some embodiments. The vertical axis indicates amplitude in arbitrary units and the horizontal axis indicates frequency components in DFT points. The equalization coefficients 305 are zeroed out at frequencies between approximately 11 and 24 and the non-zero equalization coefficients 305 are found at frequencies below 11 and above 24. The equalization coefficients 310 indicated by dashed lines and circles represent the values of the equalization coefficients 310 before the equalization coefficients 310 have been modified to zero out a subset of the equalization coefficients 310 and generate the equalization coefficients 305. The frequency range of the zeroed out equalization coefficients 305 may be increased or decreased and, in some embodiments, the frequency range of the zeroed out equalization coefficients 305 may be approximately the same as the frequency range of zeroed out inverse chromatic dispersion coefficients generated by an associated CDC, as discussed herein.

Figure 4:
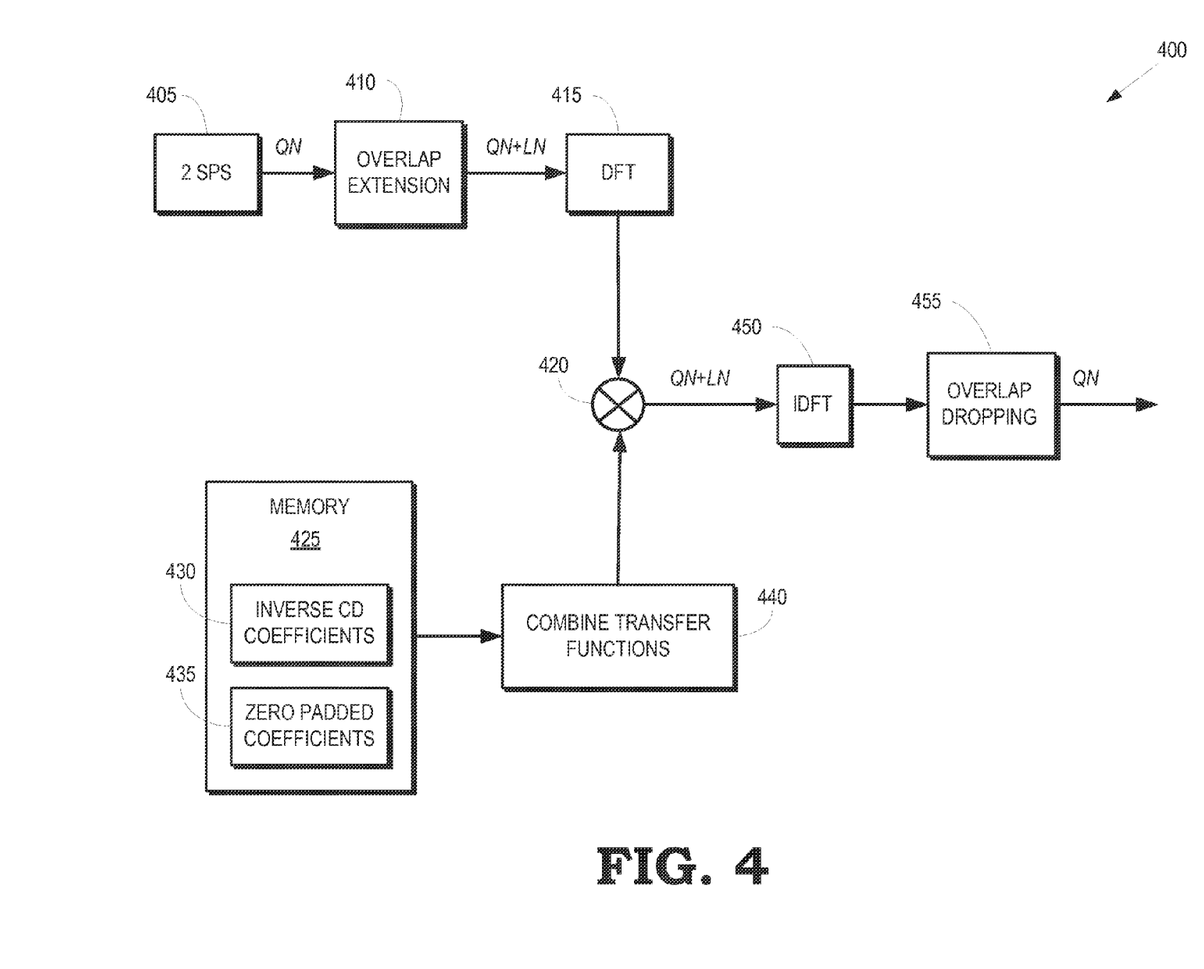
FIG. 4 is a block diagram of a first example of a chromatic dispersion compensator (CDC) according to some embodiments.

FIG. 4 is a block diagram of a first example of a chromatic dispersion compensator (CDC) 400 according to some embodiments. The CDC 400 may be used to implement some embodiments of the CDC 115 shown in FIG. 1 and may be implemented in conjunction with the FD-CMA 200 shown in FIG. 2. The CDC 400 receives digital signal values produced by sampling an analog signal at a first sampling rate such as the 2 SPS signals 405, which may correspond to the concurrent parallel signals received over the lines 110 from the ADC 105 shown in FIG. 1. An overlap extension block 410 may be used to extend the digital signal values by adding previous digital signal values that were generated by sampling an analog signal at the first sampling rate during an earlier time interval. For example, the QN sampled signals may be extended by LN samples to create an extended set of QN+LN sampled signals. Extending the set of digital signal values may improve the representation of the signals in the frequency domain. A discrete Fourier transform (DFT) block 415 is used to transform the extended set of QN+LN sampled signals into a corresponding set of frequency components that represents the sample signals. The set of frequency components may then be provided to a multiplier 420.

Some embodiments of the CDC 400 include a memory 425, which may be implemented using various types of memory such as dynamic random access memory (DRAM), static random access memory (SRAM), and the like. The memory 425 stores information identifying the inverse chromatic dispersion (CD) coefficients 430 that are used to define a transfer function that compensates for chromatic dispersion in the signals. The memory 425 also stores information identifying coefficients that are to be zeroed out using the zero padded coefficients 435. In some embodiments the zero padded coefficients 435 may define zero padding that is applied to a subset of the frequency components to effect anti-aliasing filtering in the CDC 400.

Combinational logic is used to combine the inverse chromatic dispersion coefficients 430 and the zero padded coefficients 435 to form a combined transfer function 440 that represents chromatic dispersion compensation with a subset of the inverse chromatic dispersion coefficients 430 zeroed out based on the zero padded coefficients 435. For example, the combination logic 440 may generate a combined transfer function 440, $H_{com}$:

$$H_{com} = H_{zp} \times H_{cd},$$

where $H_{zp}$ is a transfer function that represents the zero padded coefficients 435, and $H_{cd}$ is a transfer function that represents the inverse dispersion coefficients 430. In some embodiments, the frequency components associated with the zero padded coefficients 435 may correspond to the frequency components associated with the equalization coefficients that are zeroed out by the FD-CMA 200 shown in FIG. 2. In some embodiments, combination of the transfer functions to generate a combined transfer function 440 can be done off-line and the combined inverse channel response can be stored in memory 425.

The combined transfer function may then be provided to the multiplier 420, which can multiply the non-zero inverse chromatic dispersion coefficients of the combined transfer function and the frequency components provided by the DFT 415. The multiplier 420 may also bypass multiplying the zeroed out inverse chromatic dispersion coefficients by their corresponding frequency components, which may reduce the number of multiplications performed by the multiplier 420, e.g., the number of applications may be reduced by 40% in some cases as discussed herein. The multiplier 420 may be a primary power consumer in the CDC 400 and consequently reducing the number of multiplications may lead to a corresponding reduction in power consumption.

The multiplier 420 may provide the corrected frequency components to an IDFT 450 to transform the frequency components back into a set of time domain sample signals. For example, the IDFT 450 may generate an extended set of QN+LN sampled signals. An overlap dropping block 455 may be used to remove the sampled signals corresponding to the LN samples that were added by the overlap extension block 410 to create the extended set of QN+LN sampled signals. The CDC 400 may then provide the QN signals to a downstream component.

Figure 5:
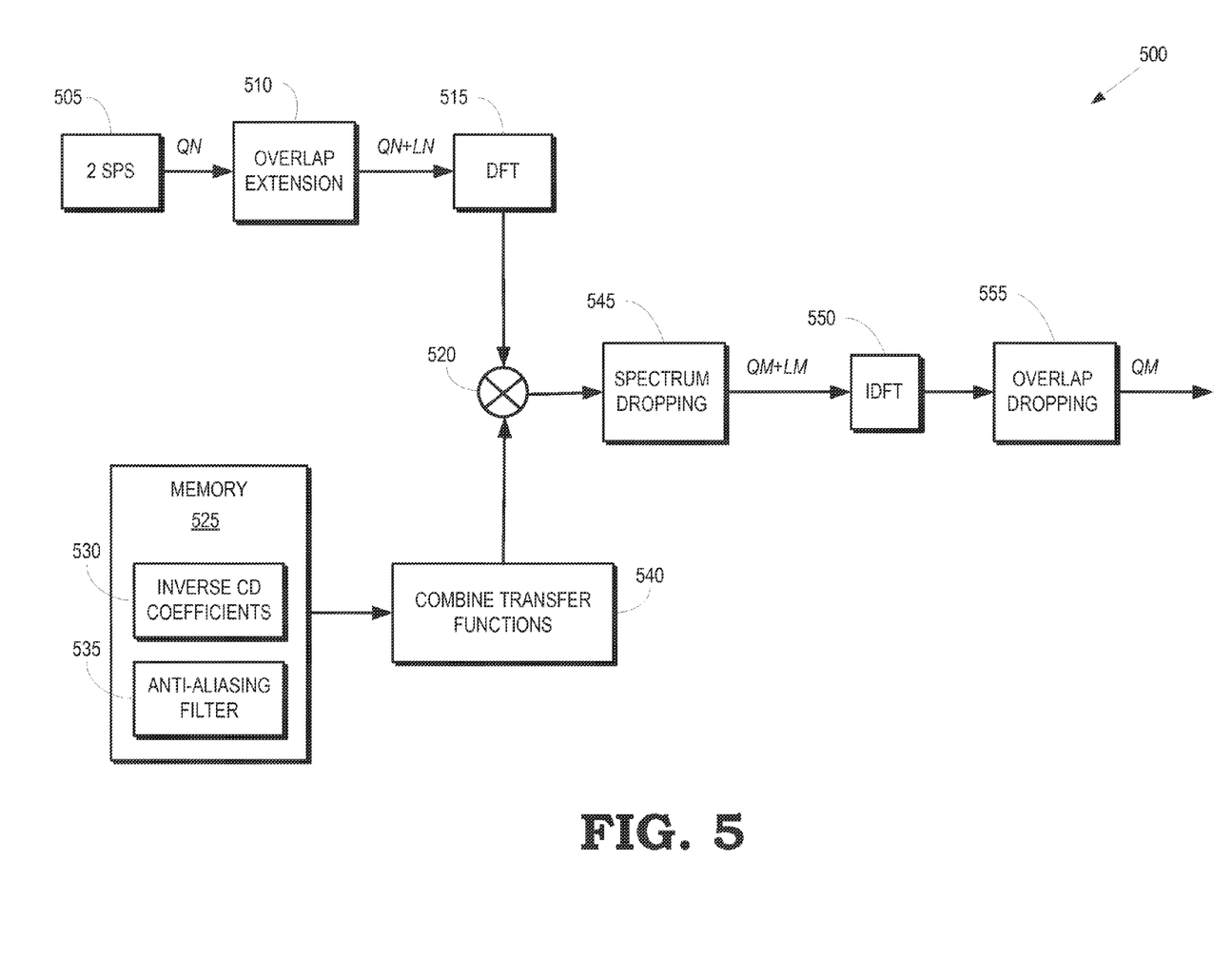
FIG. 5 is a block diagram of a second example of a CDC with integrated anti-aliasing filtering and resampling according to some embodiments.

FIG. 5 is a block diagram of a second example of a CDC 500 with integrated anti-aliasing filtering and resampling according to some embodiments. The CDC 500 may be used to implement some embodiments of the CDC 115 shown in FIG. 1. The CDC 500 receives digital signal values generated by sampling an analog signal at a first sampling rate such as the 2 SPS signals 505, which may correspond to the concurrent parallel sampled signals received over the lines 110 from the ADC 105 shown in FIG. 1. An overlap extension block 510 may be used to extend the set of digital signal values by adding previous digital signal values that were generated by sampling the analog signal at the first sampling rate during an earlier time interval. For example, the QN sampled signals may be extended by LN samples to create an extended set of QN+LN sampled signals. Extending the set of digital signal values may improve the representation of the signals in the frequency domain. A discrete Fourier transform (DFT) block 515 is used to transform the extended set of QN+LN sampled signals into a corresponding set of frequency components that represent the digital signal values. The set of frequency components may then be provided to a multiplier 520.

Some embodiments of the CDC 500 include a memory 525, which may be implemented using various types of memory such as DRAM, SRAM, and the like. The memory 525 stores information identifying the inverse chromatic dispersion (CD) coefficients 530 that are used to define a transfer function that compensates for chromatic dispersion in the signals. The memory 525 also stores information identifying an anti-aliasing filter 535. In some embodiments, the anti-aliasing filter 535 may define zero padding that is applied to the frequency components to effect anti-aliasing filtering in the CDC 500. For example, the anti-aliasing filter 535 may indicate a subset of the frequency components that are to be set to zero, or to be zeroed out, to remove frequency components that may include aliasing signals.

Combinational logic is used to combine the inverse chromatic dispersion coefficients 530 and the anti-aliasing filter 535 to form a combined transfer function 540 that represents chromatic dispersion compensation and anti-aliasing filtering. For example, the combination logic 540 may generate a combined transfer function 540, $H_{com}$:

$$H_{com} = H_{zp} \times H_{cd},$$

where $H_{zp}$ is a transfer function that represents the anti-aliasing filter 535, and $H_{cd}$ is a transfer function that represents the inverse dispersion coefficients 530. The combined transfer function 540 may then be provided to the multiplier 520, which can multiply the combined transfer function 540 and the frequency components provided by the DFT 515. In some embodiments, the combined transfer function 540 can be generated off-line and stored in the memory 525.

The multiplier 520 may provide the equalized and filtered frequency components to a spectrum dropping block 545, which may drop a subset of the frequency components that correspond to the subset of the frequency components set to zero by anti-aliasing filtering. Some embodiments of the spectrum dropping block 545 may remove the subset of frequency components and provide the remaining subset of the frequency components to an IDFT 550 to transform the frequency components back into a set of time domain sample signals. In the interest of clarity, the spectrum dropping block 545 is shown as a separate functional block that is implemented after the multiplier 520. However, in some embodiments, the frequency components are dropped from the signals provided by the DFT 515 and the transfer function coefficients provided by the combination logic 540 before performing the multiplications in the multiplier 520. Performing spectrum dropping prior to performing the multiplications may significantly reduce the computational effort required to perform complex number multiplication in the multiplier 520. Dropping the frequency components results in a resampled set of time domain signals that correspond to a lower sampling rate, e.g. a sampling rate of 1.P SPS. For example, the IDFT 550 may generate an extended set of QM+LM sampled signals. An overlap dropping block 555 may be used to remove the sampled signals corresponding to the LN samples that were added by the overlap extension block 510 to create the extended set of QN+LN sampled signals. The CDC 500 may then provide the QM sampled signals to downstream component such as the time error detector 125 shown in FIG. 1.

Figure 6:
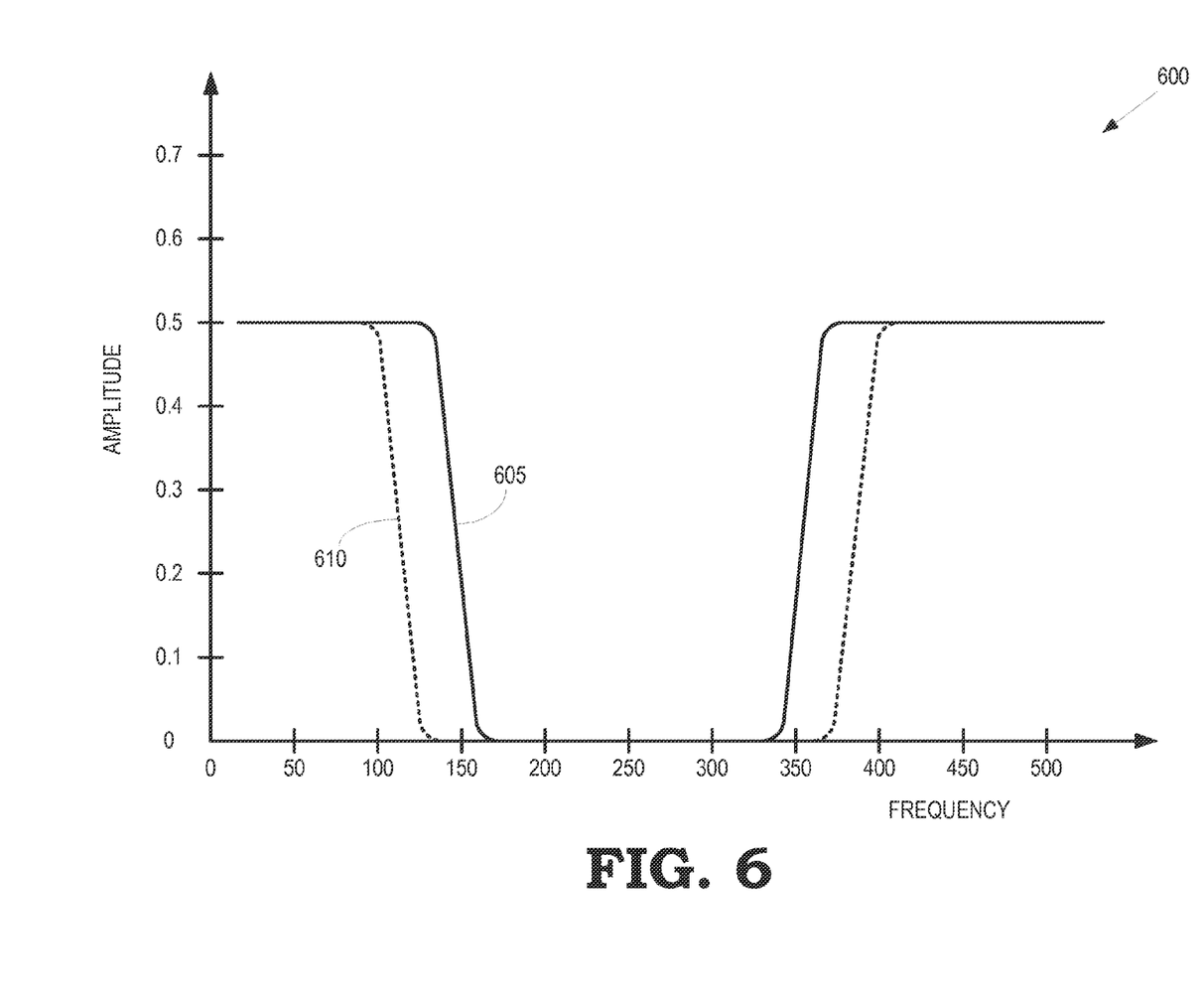
FIG. 6 is a plot of zero padding transfer functions according to some embodiments.

FIG. 6 is a plot 600 of zero padding transfer functions 605, 610 according to some embodiments. The zero padding transfer function 605, 610 may be represented by an anti-aliasing filter 535 stored in the memory 525 and may be used for anti-aliasing filtering in the CDC 500 shown in FIG. 5. The zero padding transfer function 605, 610 may also be used to define the zero padded coefficients 435 shown in FIG. 4. The vertical axis indicates amplitude in arbitrary units and the horizontal axis indicates frequency components in DFT points. The zero padding transfer function 605 zeros out frequencies between approximately 150 and 350, and the zero padding transfer function 610 zeros out frequencies between approximately 130 and 380. Thus, the zero padding transfer function 610 zeros out a larger range of frequency components and may therefore be used for anti-aliasing filtering when the CDC resamples to smaller sampling rates. For example, the zero padding transfer function 605 may be used for anti-aliasing filtering in embodiments of the CDC that sample digital signal values at a sampling rate of 1.2 SPS instead of the sampling rate of 2 SPS used to generate the received digital signal values. The zero padding transfer function 610 may be used for anti-aliasing filtering in embodiments of the CDC that sample digital signal values at a sampling rate of 1.0 SPS instead of the sampling rate of 2 SPS used to generate the received digital signal values. In some embodiments, the range of the zeroed out components of the zero padding transfer function 605 or 610 may correspond to the range of zeroed out components of the equalization coefficients 305 shown in FIG. 3

Figure 7:
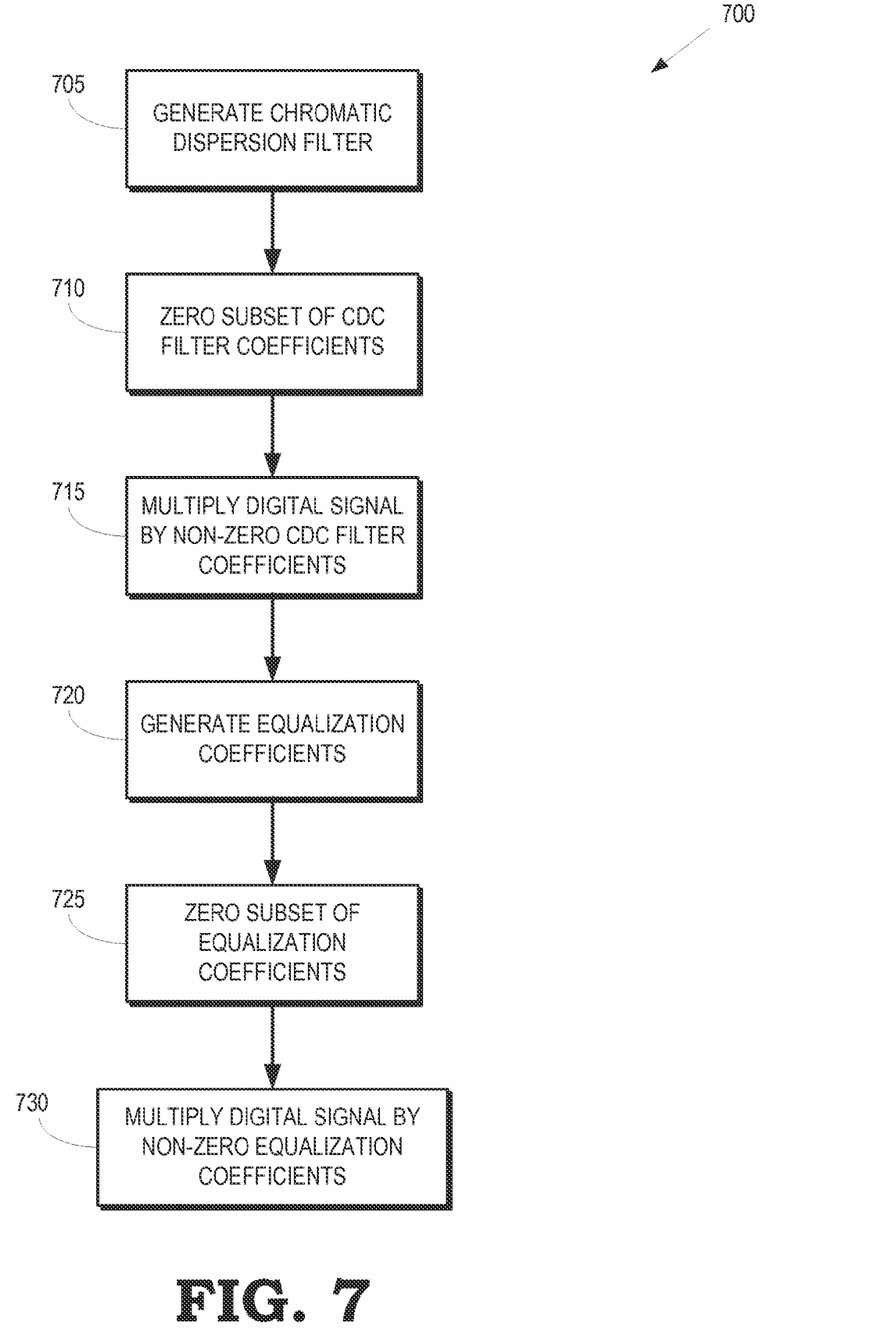
FIG. 7 is a flow diagram of a method for performing chromatic dispersion correction and equalization in an optical receiver according to some embodiments.

FIG. 7 is a flow diagram of a method 700 for performing chromatic dispersion correction and equalization in an optical receiver according to some embodiments. The method 700 may be implemented in some embodiments of the portion 100 of the optical receiver shown in FIG. 1. At block 705, the CDC in the optical receiver generates a chromatic dispersion filter, which may be represented as a transfer function determined based on inverse chromatic dispersion coefficients, as discussed herein. At block 710, the CDC zeros out a subset of the CDC filter coefficients. At block 715, the CDC multiplies a subset of the frequency components of a digital signal representative of the received optical signal by the non-zero CDC filter coefficients. The CDC may also bypass multiplying the zeroed out CDC filter coefficients by corresponding frequency components. The digital signal, corrected for chromatic dispersion and (optionally) down sampled to a lower sampling rate, may then be provided to downstream elements including an equalizer.

At block 720, the equalizer generates equalization coefficients, e.g., using a CMA or LMS algorithm. At block 725, the equalizer zeros out a subset of the equalization coefficients. Some embodiments of the equalizer may zero out a subset of the equalization coefficients corresponding to the subset of the CDC filter coefficients that were zeroed out by the CDC. At block 730, the equalizer multiplies a subset of the frequency components of the digital signal provided by the CDC by the non-zero equalization coefficients. The equalizer may also bypass multiplying the zeroed out equalization coefficients by corresponding frequency components. Embodiments of the method 700 depicted in FIG. 7 may coordinate operation of the CDC and the equalizer to zero out the same or similar frequency ranges. However, in some embodiments, the CDC may not zero out components of the inverse chromatic dispersion coefficients and only the equalizer may zero out components of the equalizer coefficients.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical receiver, comprising:
an equalizer configured to generate a plurality of equalization coefficients corresponding to a plurality of frequency components of a first frequency domain signal representative of an optical signal received by the optical receiver, the equalizer is further configured to set to zero a first subset of the plurality of equalization coefficients corresponding to a first subset of the plurality of frequency components and apply a second subset of non-zero equalization coefficients to the first frequency domain signal, wherein the equalizer is further configured to multiply the second subset of non-zero equalization coefficients and portions of the first frequency domain signal corresponding to a second subset of the plurality of frequency components, and wherein the equalizer is further configured to bypass multiplying the first subset of the equalization coefficients and portions of the first frequency domain signal corresponding to the first subset of the plurality of frequency components.

2. The optical receiver of claim 1, wherein the equalizer is further configured to represent a time domain signal corresponding to the optical signal as a first set of frequency components, wherein the time domain signal is sampled at a first sampling rate.

3. The optical receiver of claim 2, wherein the equalizer is further configured to sample digital signal values at a second sampling rate whereby such values were obtained from sampling the time domain signal at the first sampling rate.

4. The optical receiver of claim 2, further comprising:
a chromatic dispersion compensator configured to generate inverse chromatic dispersion coefficients corresponding to the plurality of frequency components and to zero out a first subset of the inverse chromatic dispersion coefficients corresponding to the first subset of the plurality of frequency components and apply a second subset of non-zero inverse chromatic dispersion coefficients to a second frequency domain signal.

5. The optical receiver of claim 4, wherein the chromatic dispersion compensator is further configured to multiply the second subset of the non-zero inverse chromatic dispersion coefficients and portions of the second frequency domain signal corresponding to the second subset of the plurality of frequency components, and wherein the chromatic dispersion compensator is further configured to bypass multiplying the first subset of the inverse chromatic dispersion coefficients and portions of the second frequency domain signal.

6. The optical receiver of claim 4, wherein the chromatic dispersion compensator is further configured to receive a first plurality of digital signal values produced by sampling an analog signal at a third sampling rate.

7. The optical receiver of claim 6, wherein the first sampling rate the third sampling rate are about equal.

8. The optical receiver of claim 6, wherein the chromatic dispersion compensator is further configured to sample the first plurality of digital signal values at the first sampling rate by dropping a third subset of the frequency components, and wherein the chromatic dispersion compensator is further configured to zero out the first subset of the inverse chromatic dispersion coefficients prior to sampling at the first sampling rate.

9. The optical receiver of claim 8, wherein a ratio of the third sampling rate to the first sampling rate is N/M, and wherein N and M are integers.

10. A method, comprising:
transforming a time domain signal corresponding to an optical signal received by an optical receiver into a first frequency domain signal, wherein the time domain signal is sampled at a first sampling rate;
generating, at an equalizer, a plurality of equalization coefficients corresponding to a plurality of frequency components of the first frequency domain signal representative of the optical signal;
zeroing out a first subset of the equalization coefficients corresponding to a first subset of the plurality of frequency components;
applying a second subset of non-zero equalization coefficients to the first frequency domain signal,
wherein the equalizer is further configured to multiply the second subset of non-zero equalization coefficients and portions of the first frequency domain signal corresponding to a second subset of the plurality of frequency components, and wherein the equalizer is further configured to bypass multiplying the first subset of the equalization coefficients and portions of the first frequency domain signal corresponding to the first subset of the plurality of frequency components.

11. A method, comprising:
configuring an equalizer to generate a plurality of equalization coefficients corresponding to a plurality of frequency components of a first frequency domain signal representative of an optical signal received by an optical receiver;
configuring the equalizer to set to zero a first subset of the plurality of equalization coefficients corresponding to a first subset of the plurality of frequency components and apply a second subset of non-zero equalization coefficients to the first frequency domain signal;
configuring the equalizer to multiply the second subset of non-zero equalization coefficients and portions of the first frequency domain signal corresponding to a second subset of the plurality of frequency components; and
configuring the equalizer to bypass multiplying the first subset of the equalization coefficients and portions of the first frequency domain signal corresponding to the first subset of the plurality of frequency components.

12. The method of claim 11, wherein configuring the equalizer further comprises configuring the equalizer to represent a time domain signal corresponding to the optical signal as a first set of frequency components, wherein the time domain signal is sampled at a first sampling rate.

13. The method of claim 12, wherein configuring the equalizer further comprises configuring the equalizer to sample digital signal values at a second sampling rate whereby such values were obtained from sampling the time domain signal at the first sampling rate.

14. The method of claim 12, further comprising configuring a chromatic dispersion compensator to generate inverse chromatic dispersion coefficients corresponding to the plurality of frequency components and to zero out a first subset of the inverse chromatic dispersion coefficients corresponding to the first subset of the plurality of frequency components and apply a second subset of non-zero inverse chromatic dispersion coefficients to a second frequency domain signal.

15. The method of claim 14, wherein configuring the chromatic dispersion compensator further comprises configuring the chromatic dispersion compensator to multiply the second subset of the non-zero inverse chromatic dispersion coefficients and portions of the second frequency domain signal corresponding to the second subset of the plurality of frequency components, and wherein the chromatic dispersion compensator is further configured to bypass multiplying the first subset of the inverse chromatic dispersion coefficients and portions of the second frequency domain signal.

16. The method of claim 14, wherein configuring the chromatic dispersion compensator further comprises configuring the chromatic dispersion compensator to receive a first plurality of digital signal values produced by sampling an analog signal at a third sampling rate.

17. The method of claim 16, wherein the first sampling rate and the third sampling rate are about equal.

18. The method of claim 16, wherein configuring the chromatic dispersion compensator further comprises configuring the chromatic dispersion compensator to sample the first plurality of digital signal values at the first sampling rate by dropping a third subset of the frequency components, and wherein the chromatic dispersion compensator is further configured to zero out the first subset of the inverse chromatic dispersion coefficients prior to sampling at the first sampling rate.

19. The method of claim 18, wherein a ratio of the third sampling rate to the first sampling rate is N/M, and wherein N and M are integers.

* * * * *